July 21, 1953 F. C. GRACE ET AL 2,646,461

TELEVISION TEST SYSTEM

Filed Sept. 16, 1950 2 Sheets-Sheet 1

INVENTORS
FRANCIS C. GRACE
ROBERT G. ARTMAN
BY Darby & Darby
ATTORNEYS

July 21, 1953 F. C. GRACE ET AL 2,646,461

TELEVISION TEST SYSTEM

Filed Sept. 16, 1950 2 Sheets-Sheet 2

INVENTORS
FRANCIS C. GRACE
ROBERT G. ARTMAN
BY Darby & Darby
ATTORNEYS

Patented July 21, 1953 2,646,461

UNITED STATES PATENT OFFICE 2,646,461

TELEVISION TEST SYSTEM

Francis C. Grace, New York, and Robert G. Artman, Roslyn, N. Y., assignors to Allen B. Du Mont Laboratories, Inc., Clifton, N. J., a corporation of Delaware Application September 16, 1950, Serial No. 185,248

4 Claims. (Cl. 178—5)

This invention relates to a method and apparatus for testing television transmitters.

It is desirable in measuring the frequency response of a television transmitter to apply, in systematic order, signals having all of the frequencies which the transmitter is designed to pass and to measure at various points in the transmitter the response of the variation sections of the transmitter. The apparatus for achieving this result comprises briefly a variable frequency oscillator connected to the video input terminals of the transmitter to supply thereto all of the desired modulating frequencies, a receiver tuned in synchronism with the applied frequencies, and a voltage indicator such as a cathode ray tube to measure the response of the transmitter to said applied frequencies.

It is one object of this invention to provide an improved transmitter testing system.

Other objects are to provide a video wobbulator having an output frequency which is inherently tracked with the tuning of a continuously tunable receiver, to provide a video wobbulator adapted to supply signals to the video input terminals of a television transmitter and to combine with the tunable receiver and an indicator to test the frequency response of the complete television transmitter or any portion thereof, and to provide means for testing the low frequency by-passing elements of the R. F. section of a television transmitter.

Other objects will be apparent after studying the following specification and drawings in which.

Figure 1:
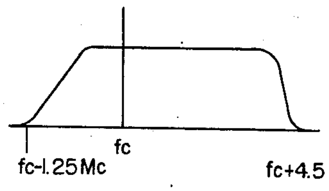
Figure 1 shows the desired frequency response of a television transmitter operating with the present day vestigial side band response.

It will be seen from examination of Figure 1 that the upper and lower side bands about the carrier frequency $F_c$ are unequal. The lower side band is filtered out below a frequency of 1.25 mcs. under the carrier frequency while the upper sideband extends out to a frequency which exceeds the carrier by 4.5 mcs.

Figure 2:
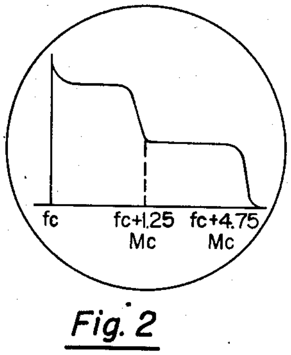
Figure 2 shows the undesired pattern obtained on the cathode ray indicator when an untuned receiver is used to pick up the response of the transmitter circuits.

When the output signal of a standard video wobbulator is applied to the video input terminals of the transmitter, the rectified signal transmitted from the antenna should appear as shown in Figure 2 when applied to the vertical deflection plates of a cathode ray oscillograph. The pedestal at the low frequency end of the pattern results from the fact that both sidebands within 1.25 mc. of the carrier contribute energy to the rectified signal, while only the upper sideband contributes energy when the modulating frequency exceeds 1.25 mc. The resultant pedestal in the pattern masks the true low frequency response. This invention makes it possible to obtain an exact picture of the transmitter response throughout a range covering the desired band of transmitted frequencies plus adjacent guard bands.

Figure 3:
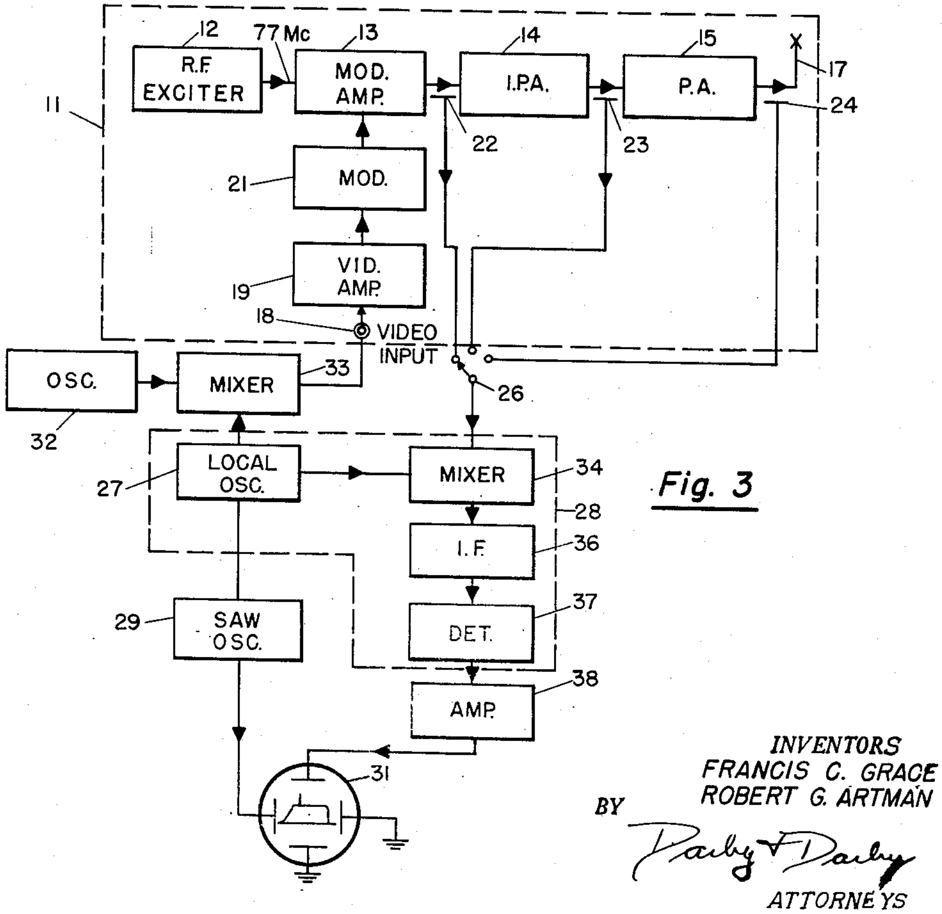
Figure 3 shows in block form a circuit of the measuring device of the instant invention.

The transmitter portion of the circuit of Figure 3 within the dotted rectangle 11 comprises an R. F. exciter 12, which transmits the carrier frequency signal to a chain of amplifiers comprising, in order, a modulated amplifier 13, an intermediate power amplifier 14, and a power amplifier 15 to which the antenna 17 is connected. The video signal is applied to the video terminals 18 from which it passes through the video amplifier 19 to the modulator 21. The output of the modulator is connected in the well known way to the modulated amplifier 13. A plurality of test points indicated at 22, 23 and 24 are connected to a switch 26 which may be either in the transmitter or in the test equipment.

The local oscillator 27 of the receiver, outlined by the dotted line 28, serves also as the variable frequency oscillator of the test equipment. By using the oscillator 27 both as the frequency varying oscillator and as the local oscillator of the receiver, tracking problems are obviated. The frequency of the oscillator 27 may be varied by a modulating signal from a sawtooth oscillator 29, which also provides a horizontal deflection signal for the cathode ray tube indicator 31, although other known means for varying the frequency may be used if desired.

In order for the oscillator 27 to serve as a local oscillator for the receiver 28 its instantaneous frequency must differ from the component of the transmitted frequency being examined by the intermediate frequency of the receiver. The intermediate frequency in turn is preferably selected to be greater than the highest modulating frequency, which is arbitrarily selected here as 7 mcs.

Figure 4:
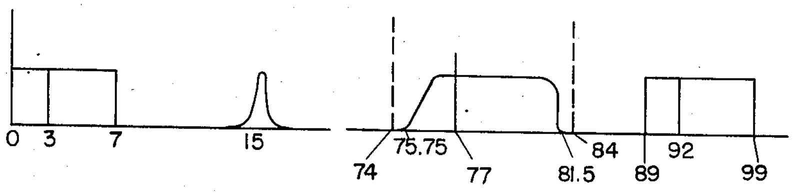
Figure 4 shows the frequency relationships in the circuit of Figure 3.

Referring to Figure 4 in which the numbers indicate the frequency in megacycles, the modulating signal varies from 3 mcs. to 0 and back to 7 mcs. The intermediate frequency is selected as 15 megacycles, and, since the assigned transmitter channel lies between 75.75 megacycles and 81.5 megacycles with a carrier at 77 megacycles, the oscillator 27 must vary in frequency from 89 mcs. to 99 mcs. In order to reduce the output frequencies of the oscillator 27 to the low video frequency range, another oscillator 32 having a fixed frequency of 92 mcs. is used. When this 92 mcs. signal is mixed with the 89—99 megacycle signal in the mixer 33 and the low frequency components are selected, the desired three-to-zero-to-seven megacycle change is obtained, and this signal is applied to the input terminals 18.

It is well known in heterodyne theory that the amplitude of the output signal of a mixer is determined principally by the amplitude of the less powerful of the two input signals. Utilizing this fact, the amplitude of the signal from the oscillator 27 is selected to be much stronger than the amplitude of the signal from the oscillator 32 in order to eliminate the incidental amplitude modulation of the swept oscillator and thus obtain the desired constant output signal from the mixer 33.

The signal appearing at one of the test points 22, 23 or 24 is selected by the switch 26 and applied to the heterodyne mixer 34 in receiver 28. The frequency to which the receiver 28 is tuned is determined solely by the frequency of the local oscillator 27 since no R. F. amplifier precedes the mixer 34, which is itself untuned. The sole image rejection therefore lies in the narrow tuning of the I. F. amplifier 36, which is preferably tuned to a high frequency in order to separate the desired frequency from the image frequency by a wide band. Use is again made of the fact that the amplitude of the signal from a mixer is determined by the amplitude of the weaker input signal, and the signal from the oscillator 27 is selected to be considerably stronger than the signal passing through the switch 26. The output signal from the I. F. amplifier 36 is detected in the usual way by the detector 37, and the voltage from the detector 37 is amplified in an amplifier 38 which must have a good low frequency response and be preferably a D. C. amplifier.

In the operation of the circuit in Figure 3, the local oscillator 27 is tuned repetitively to 89 mcs. and its output signal is mixed with the 92 mcs. signal from the oscillator 32 in mixer 33 to obtain a signal having frequency of 3 mc., which is applied to the input terminals 18 of the transmitter as a modulating signal. The receiver 28 is simultaneously tuned to receive a signal of 74 mcs. which is below the prescribed bandpass of the transmitter 11. If a signal having a frequency of 74 mcs. is picked up by one of the probes, say probe 22, it beats with the local oscillator frequency of 89 mcs. to produce an intermediate frequency of 15 mcs. Correspondingly, as the tuning of the local oscillator 27 is changed to 92 mcs., the frequency of the signal applied to the terminals 18 is zero megacycles, and the receiver 28 is tuned to the carrier frequency of 77 mcs. It follows that, when the oscillator 27 is tuned to any frequency between its limits of 89 and 99 mcs. the receiver is automatically tuned to receive just one frequency within the transmitted band.

Figure 5:
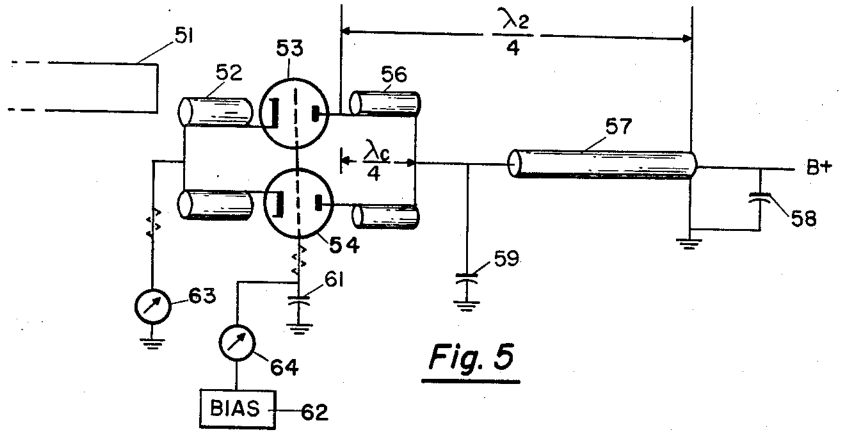
Figure 5 is a schematic diagram of one stage of a typical television transmitter.

Figure 5 is a schematic diagram of one stage, e. g., the intermediate power amplifier 14. In this circuit the driving signal is coupled through an inductance 51 to the tuned cathode lines 52 which are connected to the push-pull amplifier tubes 53 and 54 in a grounded grid circuit. The plate lines 56 are connected to the B plus through a shielded line or coaxial cable 57 which is bypassed for all frequencies at the power supply end by the condenser 58. A condenser 59 at the junction of the lines 56 and 57 is the R. F. bypass condenser and it serves to by-pass the higher modulating frequencies as well. The grids of the tubes 53 and 54 are effectively grounded through the condenser 61 across which the bias voltage from the source 62 is applied. Meters 63 and 64 are connected in series with the cathode and grid circuits respectively.

Figure 6:
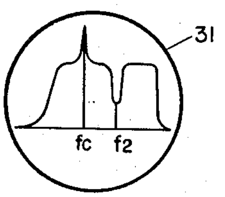
Figure 6 shows the indicator pattern resulting from a special type of misadjustment of the circuit in Figure 5.
Figure 7:
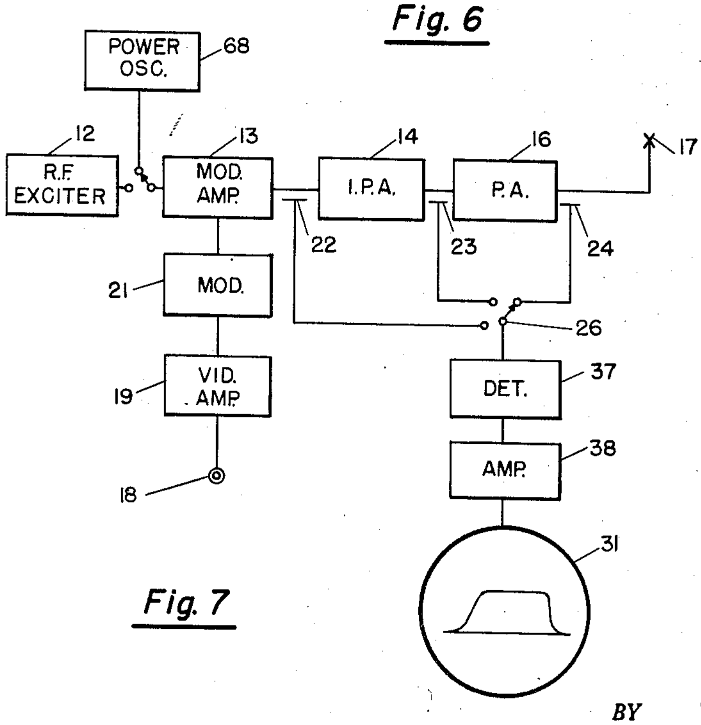
Figure 7 is a block diagram of transmitter testing equipment.

The coaxial cable 57 is used as a safety precaution in order to be able to run the high voltage leads for several feet from the power supply to the power amplifiers without exposing operating personnel to these high voltages. There will be some frequency at which the coaxial line 57 will be tuned to resonanance by the capacitor 59, and if this frequency is within the video band, the signal being amplified will suffer a reduction in modulation when the modulating frequency is that at which the by-pass system resonates. The reason is as follows: When the modulated R. F. signal received from inductance 51 is momentarily increasing due to modulation, the output of the amplifier increases also. To do this, however, it must draw more plate current. If there is an impedance at the modulation frequency in series with the plate supply, the increasing current will result in a decreasing plate voltage. This tends to plate-modulate the amplifier in a direction which opposes the modulation on the incoming signal, thus reducing its value. The same effect may be produced by faulty by-pass in the cathode or grid circuits, or in the screen grid circuit when a tetrode is used. These defects, though they degrade the picture quality, will not be evident when the transmitter is wobbulated by the prior art method of substituting an R. F. wobbulator for the R. F. exciter of the transmitter, because such method does not involve actual video modulation. When wobbulating by the method described herein, however, a notch will appear in the curve, as shown in Figure 6, immediately calling attention to the trouble, and indicating the frequency $F_2$, at which the by-pass is unsatisfactory.

Although this invention has been described in terms of a specific embodiment, modifications may be made without departing from the scope of the following claims.

What is claimed is:

1. Television transmitter testing apparatus comprising a heterodyne receiver having a tunable local oscillator, a second oscillator, a first mixer connected to both said oscillators to mix the signals therefrom, means to select the low frequency components of the mixed signals and modulate said transmitter therewith, pickup means to extract the modulated signals from said transmitter and apply said signals to said receiver, a second mixer in said receiver connected to said pickup means and to said local oscillator to mix the output thereof with said modulated signals, and an indicator device connected to the output of said second mixer to measure the amplitude of the instantaneous output signal voltage thereof.

2. Television transmitter testing apparatus comprising a heterodyne receiver having a tunable local oscillator, a second oscillator, a first mixer connected to both said oscillators to mix the signals therefrom, means to select the low frequency components of the mixed signals and modulate said transmitter therewith, means to pick up the modulated signals from said transmitter and apply said signals to said receiver, a second mixer in said receiver connected to said pickup means and to said local oscillator to mix the output thereof with said modulated signals, an amplifier connected to said mixer and tuned to amplify a narrow band of frequencies containing a beat frequency produced in said second mixer, and an indicator device connected to the output of said second mixer to measure the amplitude of the instantaneous output of the last resultant mixed voltage.

3. The apparatus of claim 2 in which said amplifier is tuned to amplify a narrow band of frequencies above the highest frequency of said low frequency components.

4. Television apparatus comprising a transmitter and a tunable superheterodyne receiver, said receiver comprising means to receive signal output from said transmitter, a source of frequency varying oscillations connected to amplitude modulate the output of said transmitter, said source being connected to said receiver as a source of local oscillations therefor and to tune said receiver in frequency synchronism with the instantaneous frequency generated by said transmitter, and an indicating device connected to the output of said receiver to indicate the response of said transmitter to said frequency varying oscillations.

ROBERT G. ARTMAN.
FRANCIS C. GRACE.

References Cited in the file of this patent

UNITED STATES PATENTS

| Number | Name | Date |
|---|---|---|
| 2,315,377 | Poch | Mar. 30, 1943 |
| 2,440,261 | Ginzton | Apr. 27, 1948 |